United States Patent
Huang et al.

(10) Patent No.: US 10,476,795 B2
(45) Date of Patent: Nov. 12, 2019

(54) DATA PACKET FORWARDING

(71) Applicant: New H3C Technologies Co., Ltd., Zhejiang (CN)

(72) Inventors: Liwei Huang, Beijing (CN); Wei Wang, Beijing (CN)

(73) Assignee: NEW H3C TECHNOLOGY CO., LTD., Hangzhou (CN)

( * ) Notice: Subject to any disclaimer, the term of this patent is extended or adjusted under 35 U.S.C. 154(b) by 71 days.

(21) Appl. No.: 15/578,140

(22) PCT Filed: Jun. 16, 2016

(86) PCT No.: PCT/CN2016/085967
§ 371 (c)(1),
(2) Date: Nov. 29, 2017

(87) PCT Pub. No.: WO2016/202269
PCT Pub. Date: Dec. 22, 2016

(65) Prior Publication Data
US 2018/0167320 A1  Jun. 14, 2018

(30) Foreign Application Priority Data
Jun. 18, 2015 (CN) .......................... 2015 1 0340312

(51) Int. Cl.
*H04L 12/28* (2006.01)
*H04L 12/741* (2013.01)
(Continued)

(52) U.S. Cl.
CPC ........ *H04L 45/745* (2013.01); *H04L 12/4633* (2013.01); *H04L 12/4641* (2013.01);
(Continued)

(58) Field of Classification Search
CPC ............... H04L 45/745; H04L 61/2514; H04L 61/2582; H04L 61/2592; H04L 61/2007;
(Continued)

(56) References Cited

U.S. PATENT DOCUMENTS 9,692,698 B2 * 6/2017 Cherian ................ H04L 45/745
2004/0148439 A1 7/2004 Harvey et al.
(Continued)

FOREIGN PATENT DOCUMENTS

CN          103067534 A       4/2013
CN          104115453         10/2014
(Continued)

OTHER PUBLICATIONS

Mahalingam et al. "Virtual eXtensible Local Area Network (VXLAN): A Framework for Overlaying Virtualized Layer 2 Networks over Layer 3 Networks", Request for Comments (RFC):7348, Aug. 2014, pp. 1-22. (Year: 2014).*

(Continued)

*Primary Examiner* — Lan-Huong Truong
(74) *Attorney, Agent, or Firm* — McCarter & English, LLP; Kia L. Freeman; Thomas F. Foley (57) ABSTRACT

A SDN controller obtains and stores a NAT mapping relationship between a private network address and a public network of a host computer in each SDN; receives a flow table request for a data packet from a VTEP device, searching for a NAT mapping relationship corresponding to a target IP address of the data packet when determining that the data packet is forwarded across SDNs; generates a flow table used for forwarding the data packet according to the NAT mapping relationship corresponding to the target IP address searched out and network topology information, and transmits the flow table to the VTEP device, wherein the flow table comprises a NAT processing instruction for a (Continued)

source IP address and encapsulation information, and a target IP address in the encapsulation information is a public network address in the NAT mapping relationship searched out.

14 Claims, 5 Drawing Sheets

(51) Int. Cl.
    *H04L 29/12*    (2006.01)
    *H04L 12/46*    (2006.01)
    *H04L 12/24*    (2006.01)

(52) U.S. Cl.
    CPC ........ *H04L 61/2007* (2013.01); *H04L 61/256* (2013.01); *H04L 61/2514* (2013.01); *H04L 61/2582* (2013.01); *H04L 61/2592* (2013.01); *H04L 41/12* (2013.01); *H04L 2012/4629* (2013.01)

(58) Field of Classification Search
    CPC ............... H04L 61/256; H04L 12/4641; H04L 2012/4629; H04L 12/4633; H04L 41/12
    See application file for complete search history.

(56) References Cited

U.S. PATENT DOCUMENTS

| | | | |
|---|---|---|---|
| 2004/0218611 | A1 | 11/2004 | Kim |
| 2014/0123211 | A1* | 5/2014 | Wanser .................. H04L 63/10 726/1 |
| 2015/0350156 | A1 | 12/2015 | Ma et al. |

FOREIGN PATENT DOCUMENTS

| | | |
|---|---|---|
| CN | 104468306 | 3/2015 |
| CN | 104601432 | 5/2015 |
| WO | 2011/083668 A1 | 7/2011 |
| WO | 2014/101501 A1 | 7/2014 |
| WO | WO2015053850 | 4/2015 |

OTHER PUBLICATIONS

International Search Report issued in PCT/CN2016/085967, dated Aug. 31, 2016 (4 pages).

\* cited by examiner

DATA PACKET FORWARDING

BACKGROUND

In a software defined network (SDN), network controlling is separated from physical network topologies. That is, network traffic is controlled by a controller, and private network data packets are forwarded across SDNs through Virtual Extensible LAN (VXLAN) IP gateways.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

A process of communication with a virtual machine (VM) across SDNs includes procedures as follows.

In a first SDN, when receiving a data packet from the VM, a VXLAN Tunnel End Point (VTEP) device performs VXLAN encapsulation, and forwards the encapsulated data packet to a VXLAN IP Gateway (GW). When receiving the data packet for which the VXLAN encapsulated is performed from the VTEP device, the VXLAN IP GW performs Network Address Translation (NAT), and then forwards the encapsulated data packet to a VXLAN IP GW in a second SDN.

In the second SDN, the VXLAN IP GW performs NAT to translate the source IP address of the packet entering the VXLAN IP GW to an IP address of the VM, performs the encapsulation for the VXLAN packet, and forwards the encapsulated VXLAN packet to the VTEP device. After the VXLAN packet arrives at the VTEP device connecting with a server in the second SDN, VXLAN decapsulation is performed for the VXLAN packet.

In the communication process between VMs across the SDNs above, multiple times of encapsulation operations and/or decapsulation operations are performed.

A data packet forwarding method is provided according to some examples of the present disclosure in order to implement data packet transmission across SDNs.

Before a data packet is transmitted across SDNs, a connection between SDN controllers in different SDNs is established for communication. In some examples, a BGP connection may be established.

The VTEP device configures a NAT function for VXLAN to perform NAT processing, and configures a NAT mapping relationship between a private network address and a public network address of a host computer connecting with the VTEP device. In some examples, the host computer may be a physical device, or may be a VM, and the VM is taken as an example for description hereinafter.

The VTEP device is configured to enable a VXLAN local gateway function, and reports the configured NAT mapping relationship to the SDN controller.

When receiving a NAT mapping relationship reported by a VTEP device managed by a SDN controller in each SDN, the SDN controller stores the NAT mapping relationship, and synchronizes the NAT mapping relationship to a SDN controller in another SDN, where the NAT mapping relationship is a NAT mapping relationship between a private network address and a public network address of a server connecting with the VTEP device and configured by the VTEP device.

When receiving a NAT mapping relationship synchronized from a SDN controller in another SDN, the SDN controller stores the NAT mapping relationship.

According to the processing process above, each SDN controller obtains and stores a NAT mapping relationship between a private network address and a public network address of a VM in each SDN.

Figure 1:
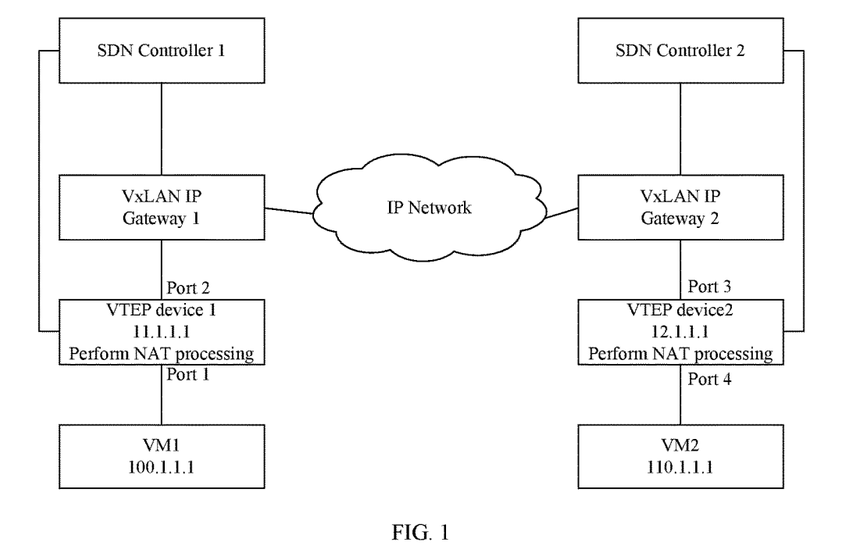
FIG. 1 is a schematic diagram illustrating a VXLAN according to some examples of the present disclosure.

FIG. 1 is a schematic diagram illustrating a VXLAN according to some examples of the present disclosure.

For a SDN1, a VTEP device 1 is configured with a NAT function, and is configured to enable a local gateway function.

The VTEP device 1 configures a NAT mapping relationship between a private network address 100.1.1.1/24 and a public network address 11.1.1.1 for a VM1, and reports the NAT mapping relationship to a SDN controller 1.

The SDN controller 1 receives and stores the NAT mapping relationship reported by the VTEP device 1, and synchronizes the NAT mapping relationship to a SDN controller 2 in a SDN2.

After receiving the NAT mapping relationship synchronized from the SDN controller 1, the SDN controller 2 stores the NAT mapping relationship in local.

For the SDN2, the VTEP device 2 is configured with the NAT function, and is configured to enable the local network function.

The VTEP device 2 configures a NAT mapping relationship between a private network address 110.1.1.1/24 and a public network address 12.1.1.1 of a VM2, and reports the NAT mapping relationship to the SDN controller 2.

The SDN controller 2 receives and stores the NAT mapping relationship reported by the VTEP device 2, and synchronizes the NAT mapping relationship to the SDN controller 1.

After receiving the NAT mapping relationship synchronized from the SDN controller 2, the SDN controller 1 stores the NAT mapping relationship in local.

Thus, both the SDN controller 1 and the SDN controller 2 store the NAT mapping relationship of the VM1 and the NAT mapping relationship of the VM2. Table 1 illustrates NAT mapping relationships stored in the SDN controller 1 and the SDN controller 2.

TABLE 1

| Private Network Address | Public Network Address |
|---|---|
| 110.1.1.1 | 12.1.1.1 |
| 100.1.1.1 | 11.1.1.1 |

In Table 1, content in a second line is the NAT mapping relationship between the private network address and the public network address of the VM2, and content in a third line is the NAT mapping relationship between the private network address and the public network address of the VM1.

According to the operation above, a VXLAN tunnel is established between the VTEP device 1 and the VTEP device 2.

A process of implementing a data packet forwarding process in a VXLAN is described in detail according to some examples of the present disclosure, taken in conjunction with the accompanying drawings.

Figure 2:
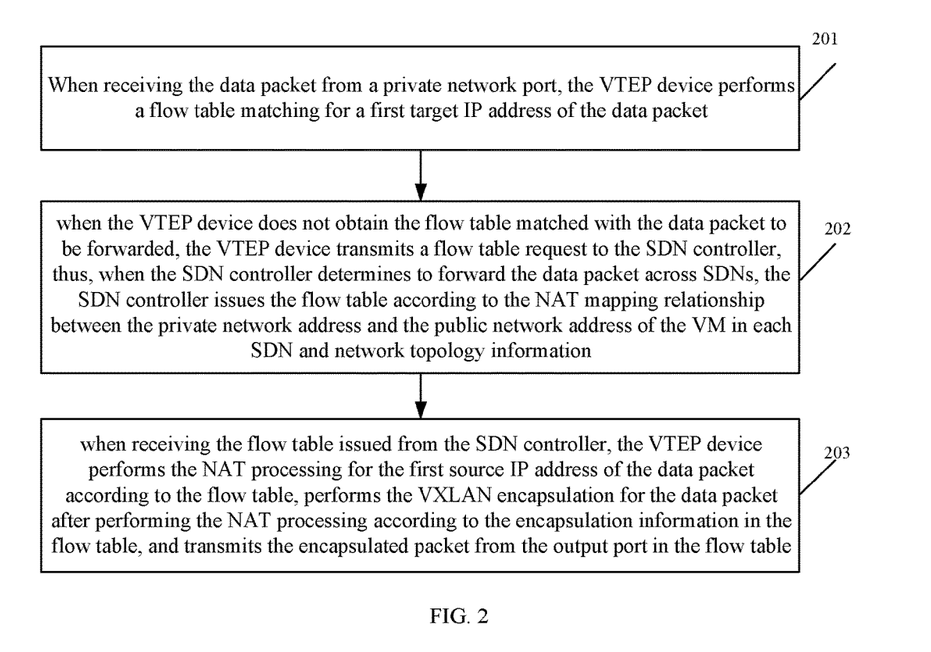
FIG. 2 is a schematic diagram illustrating a process that a VTEP device forwards a data packet from a VM according to some examples of the present disclosure.

FIG. 2 is a schematic diagram illustrating a process that a VTEP device forwards a data packet from a VM according to some examples of the present disclosure. The process includes procedures as follows.

At block 201, when receiving the data packet from a private network port, the VTEP device performs a flow table matching for a first target IP address of the data packet.

When obtaining the flow table matched with the data packet to be forwarded, the VTEP device processes and forwards the data packet according to the flow table corresponding to the data packet.

At block 202, when the VTEP device does not obtain the flow table matched with the data packet to be forwarded, the VTEP device transmits a flow table request to the SDN controller, thus, when the SDN controller determines to forward the data packet across SDNs, the SDN controller issues the flow table according to the NAT mapping relationship between the private network address and the public network address of the VM in each SDN and network topology information.

When receiving the flow table request reported from the VTEP device and determining that the data packet is forwarded across SDNs, the SDN controller searches for the corresponding NAT mapping relationship in local according to the first target IP address of the data packet, i.e., searching for the public network address corresponding to the first target IP address of the data packet.

The SDN controller generates the flow table of the data packet used to forward the data packet according to the NAT mapping relationship searched out and the network topology information.

The flow table includes matching information (a first target IP address of the data packet), an instruction for performing the NAT processing for the first source IP address, and encapsulation information (the NAT mapping relationship corresponding to the first target IP address of the data packet, the target MAC address is the MAC address of a next hop device, and a VXLAN identifier corresponding to the public network address) and an output port.

At block 203, when receiving the flow table issued from the SDN controller, the VTEP device performs the NAT processing for the first source IP address of the data packet according to the flow table, performs the VXLAN encapsulation for the data packet after performing the NAT processing according to the encapsulation information in the flow table, and transmits the encapsulated packet from the output port in the flow table.

A second target IP address in the encapsulation information in block 203 is the public network address corresponding to the first target IP address of the received data packet.

In some examples, the flow table may include an instruction for performing the NAT processing for the first source IP address, but may not include the IP address obtained after the NAT processing is performed for the first source IP address; or the flow table may include an instruction for performing the NAT processing for the first source IP address and the IP address obtained after the NAT processing is performed for the first source IP address. When the flow table includes an instruction for performing the NAT processing for the first IP address but does not include the IP address obtained after the NAT processing is performed for the first source IP address, the NAT processing is performed for the first IP address according to the NAT mapping relationship of the VM configured in local.

According to the encapsulation information in the flow table, the VTEP device may perform the VXLAN encapsulation for the data packet after the NAT processing is performed. When the VXLAN encapsulation is performed, a second target IP address used for the encapsulation is a public network address of the first target IP address in the encapsulation information, a target MAC address is the MAC address in the encapsulation information, a second source IP address used for the encapsulation is an IP address after the NAT processing is performed for the first source IP address of the VTEP device, a source MAC address is a MAC address of the VTEP device, a VXLAN ID is a VXLAN identifier in the encapsulation information.

After the VTEP device forwards the packet for which the VXLAN encapsulation is performed through the output port in the flow table, the VXLAN packet is forwarded to a VTEP device corresponding to the second target IP address through the established VXLAN tunnel between the current VTEP device and the VTEP device corresponding to the second target IP address.

Figure 3:
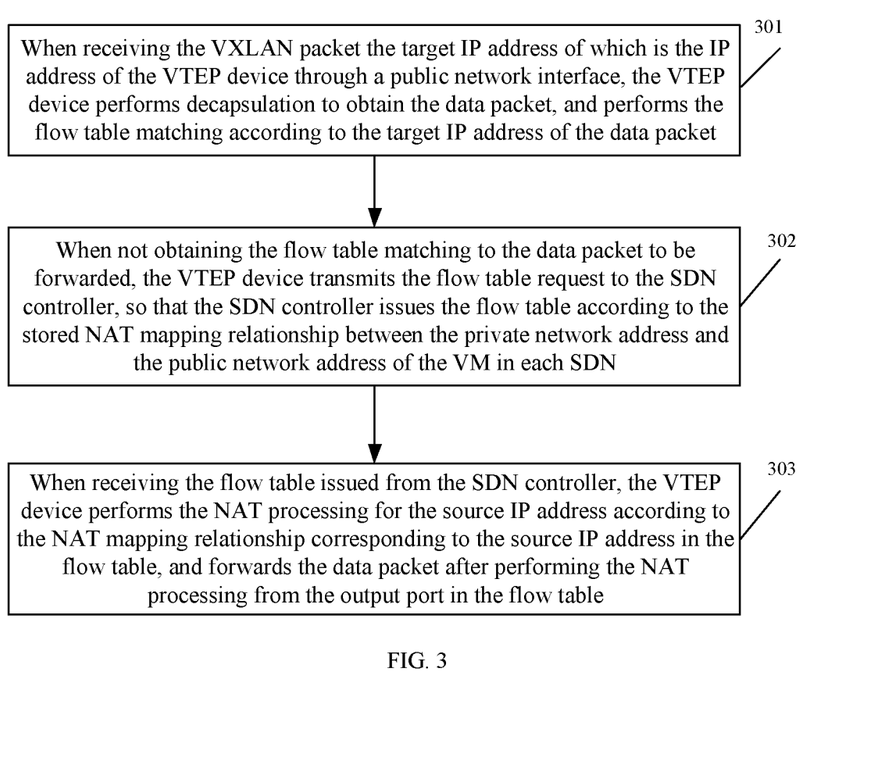
FIG. 3 is a schematic diagram illustrating a process that a VTEP device transmits a data packet to a VM according to some examples of the present disclosure.

FIG. 3 is a schematic diagram illustrating a process that a VTEP device transmits a data packet to a VM according to some examples of the present disclosure. The process includes procedures as follows.

At block 301, when receiving the VXLAN packet the target IP address of which is the IP address of the VTEP device through a public network interface, the VTEP device performs decapsulation to obtain the data packet, and performs the flow table matching according to the target IP address of the data packet.

When obtaining the flow table matching to the data packet to be forwarded, the VTEP device processes and forwards the data packet according to the flow table.

At block 302, when not obtaining the flow table matching to the data packet to be forwarded, the VTEP device transmits the flow table request to the SDN controller, so that the SDN controller issues the flow table according to the stored NAT mapping relationship between the private network address and the public network address of the VM in each SDN.

When receiving the flow table request, the SDN controller generates the flow table according to the NAT mapping relationship stored in local, and issues the flow table to the VTEP device.

The generated flow table includes: matching information (the target IP address of the data packet), a NAT mapping relationship of the source IP address (used to replace the source IP address of the data packet to the private network address) and an output port.

At block 303, when receiving the flow table issued from the SDN controller, the VTEP device performs the NAT processing for the source IP address according to the NAT mapping relationship corresponding to the source IP address in the flow table, and forwards the data packet after performing the NAT processing from the output port in the flow table.

When performing the NAT processing, the VTEP device replaces the source IP address of the data packet to the private network address in the NAT mapping relationship.

Figure 4:
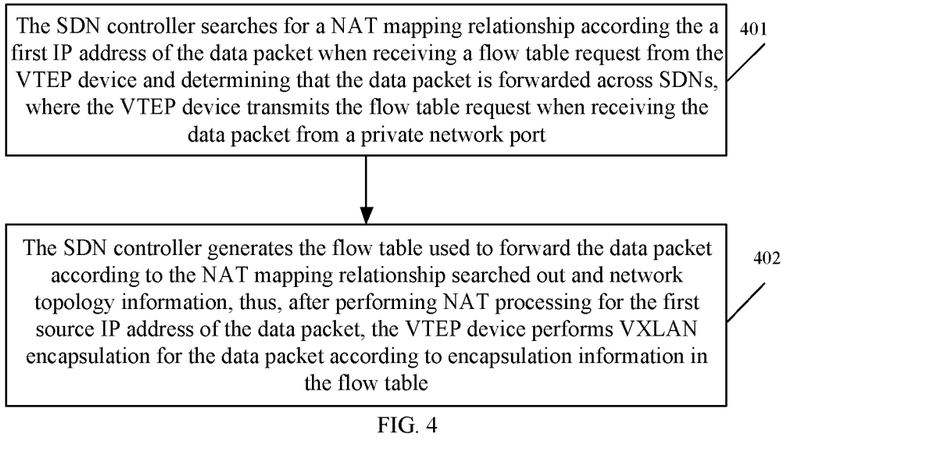
FIG. 4 is a schematic diagram illustrating a process that a SDN controller forwards a data packet from a VM according to some examples of the present disclosure.

FIG. 4 is a schematic diagram illustrating a process that a SDN controller forwards a data packet from a VM according to some examples of the present disclosure. The process includes procedures as follows.

At block 401, the SDN controller searches for a NAT mapping relationship according the a first IP address of the data packet when receiving a flow table request from the VTEP device and determining that the data packet is forwarded across SDNs, where the VTEP device transmits the flow table request when receiving the data packet from a private network port.

At block 402, the SDN controller generates the flow table used to forward the data packet according to the NAT mapping relationship searched out and network topology information, thus, after performing NAT processing for the first source IP address of the data packet, the VTEP device performs VXLAN encapsulation for the data packet according to encapsulation information in the flow table.

In this block, a second target IP address in the encapsulation information is a public network address corresponding to the first target IP address in the NAT mapping relationship searched out.

In some examples, the flow table includes content as follows: matching information (the first target IP address of the data packet), an instruction for performing the NAT processing for the first source IP address, the encapsulation information (a NAT mapping relationship corresponding to a first target IP address of the data packet, a target MAC address, i.e., a MAC address of a next hop device, and a VXLAN identifier corresponding to the public network address) and an output port.

After receiving the flow table issued from the SDN controller, the VTEP device performs NAT processing for the first source IP address of the data packet, performs VXLAN encapsulation for the data packet after performing the NAT processing. When the VXLAN encapsulation is performed, a second target IP address used for encapsulation is the public network address in the encapsulation information, the target MAC address is the MAC address in the encapsulation information, a second source IP address used for encapsulation is the public network IP address corresponding to the first source IP address of the VTEP device, the source MAC address of the MAC address of the VTEP device, the VXLAN ID is the VXLAN identifier in the encapsulation information.

The VTEP device transmits the data packet after performing the VXLAN encapsulation the output port in the flow table.

Figure 5:
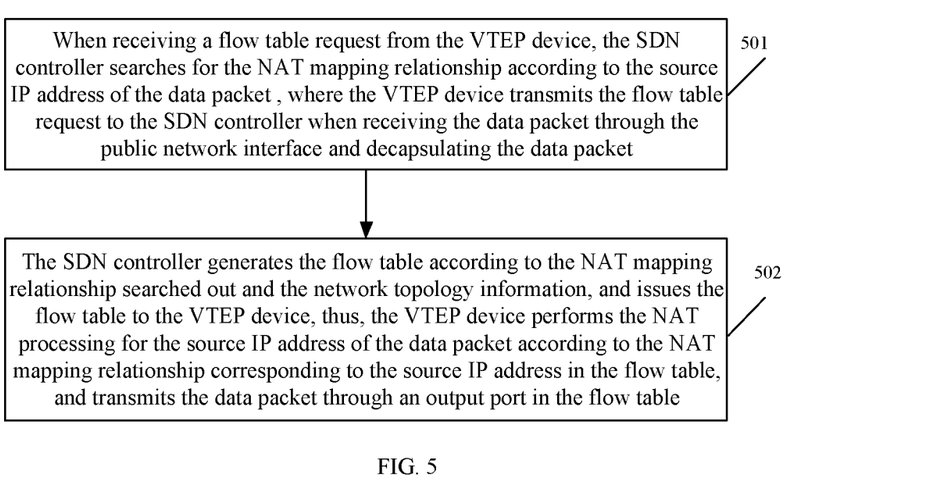
FIG. 5 is a schematic diagram illustrating a process that a SDN controller transmits a data packet to a VM according to some examples of the present disclosure.

FIG. 5 is a schematic diagram illustrating a process that a SDN controller transmits a data packet to a VM according to some examples of the present disclosure. The process includes procedures as follows.

At block 501, when receiving a flow table request from the VTEP device, the SDN controller searches for the NAT mapping relationship according to the source IP address of the data packet, where the VTEP device transmits the flow table request to the SDN controller when receiving the data packet through the public network interface and decapsulating the data packet.

At block 502, the SDN controller generates the flow table according to the NAT mapping relationship searched out and the network topology information, and issues the flow table to the VTEP device, thus, the VTEP device performs the NAT processing for the source IP address of the data packet according to the NAT mapping relationship corresponding to the source IP address in the flow table, and transmits the data packet through an output port in the flow table.

The generated flow table includes matching information (the source IP address of the data packet), the NAT mapping relationship corresponding to the source IP address (which is used to replace the source IP address of the data packet to the private network address in the NAT mapping relationship) and the output port.

When receiving the flow table from the SDN controller, the VTEP device performs the NAT processing for the source IP address of the data packet according to the NAT mapping relationship in the flow table, and forwards the data packet after performing the NAT processing through the output port in the flow table. The process that the VTEP performs the NAT processing includes replacing the source IP address of the data packet to the private network address in the NAT mapping relationship.

The process of forwarding the data packet across SDNs is described in detail, taken in conjunction with the accompanying network drawings.

Still take FIG. 1 as an example. When communication between a VM1 and a VM2 is in demand, the VM 1 constructs a data packet with the source IP address 100.1.1.1 and the target IP address 110.1.1.1, and transmits the data packet to the VTEP device 1.

When receiving the data packet, the VTEP device 1 matches the data packet to the flow table according to the target IP address of the data packet 110.1.1.1.

It is assumed that no flow table is matched, a flow table request is transmitted to the SDN controller 1, where the flow table request carries a port 1 from which the data packet is received, thus, the SDN controller determines that the data packet is from the VM according to the port 1 from which the data packet is received.

The SDN controller receives the flow table request. When it is determined that the data packet is forwarded across SDNs according to the target IP address of the data packet, the NAT mapping relationship corresponding to the target IP address 110.1.1.1 is searched out, as shown in a second line in Table 1 (110.1.1.1: 12.1.1.1).

And then, the topology information is searched for to determine the MAC address corresponding to a next hop (the MAC address of the VXLAN IP gateway) and an output port (port 2), and generates the flow table used for forwarding the data packet.

The detail content of the flow table includes matching information (110.1.1.1), an instruction for performing the NAT processing for the source IP address (which may or may not include the NAT mapping relationship), encapsulation information (12.1.1.1, a target MAC address, i.e., a MAC address of a next hop device (the MAC address of the VXLAN IP gateway 1), and the VXLAN identifier corresponding to the public network address) and the output port (the port 1).

When receiving the flow table, the VTEP device 1 performs the NAT processing for the source IP address of the data packet, i.e., after the NAT processing is performed for the source IP address of the data packet, the source IP address of the data packet is replaced to the IP address 11.1.1.1; the VTEP device 1 performs the VXLAN encapsulation for the data packet after the NAT processing is performed, where the target IP address used for encapsulation is 12.1.1.1, the source IP address is the IP address of the VTEP1 11.1.1.1; the target MAC address is the MAC address of the VXLAN IP gateway 1, the source MAC address is the MAC address of the VTEP1.

The VTEP device 1 forwards the data packet after performing the VXLAN encapsulation through the output port in the flow table.

The data packet after performing the VXLAN encapsulation is forwarded through a VXLAN tunnel between the VTEP device 1 and the VTEP device 2. The data packet is forwarded according to the target IP address on each device between the VTEP device 1 and the VTEP device 2, until the data packet is transmitted to the VTEP device 2.

When receiving the VXLAN packet and determining that the target IP address is the IP address of the VTEP device 2, the VTEP device 2 decapsulates the VXLAN packet, and obtains the data packet.

The VTEP device 2 searches for the corresponding flow table according to the target IP address of the data packet, when the corresponding flow table is not searched out, the flow table request is transmitted to the SDN controller 2, which carries information about the port 3, so that the SDN controller 2 knows that the VXLAN packet is received from the public network and the data packet is obtained by decapsulating the VXLAN packet.

The VTEP device 2 searches for the corresponding NAT mapping relationship according to the source IP address of the data packet 11.1.1.1, generates the flow table according to the NAT mapping relationship searched out and the network topology information, and transmits the flow table to the VTEP device 2.

The flow table includes matching information (110.10.1.1), the NAT mapping relationship corresponding to the source IP address (the private network address corresponding to the source IP address of the data packet in the NAT mapping relationship) and an output port (port 4).

After receiving the flow table, the VTEP device 2 performs the NAT processing for the source IP address of the data packet, i.e., the NAT processing is performed for the source IP address 11.1.1.1, to obtain 100.1.1.1, and transmits the data packet to the VM2.

So far, the process that the data packet is transmitted from VM1 to VM2 across SDNs finishes.

Figure 6:
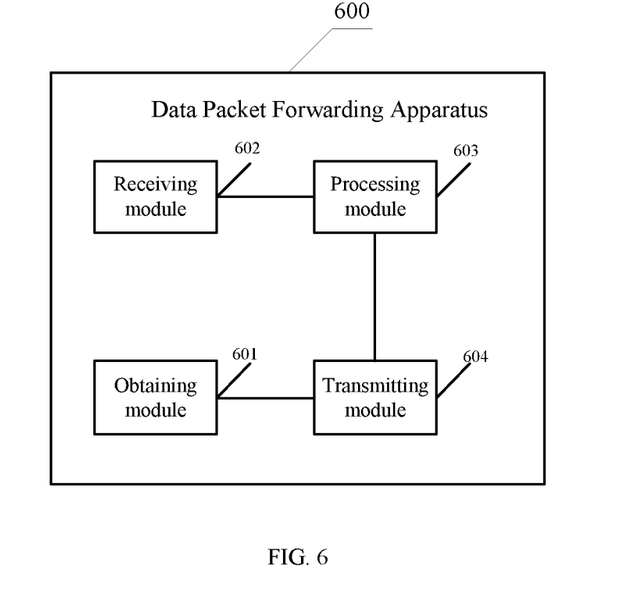
FIG. 6 is a schematic diagram illustrating a structure of a data packet forwarding apparatus implemented by a SDN controller according to some examples of the present disclosure.

Based on a same idea, the present disclosure provides a data packet forwarding apparatus, to be implemented by a SDN controller. FIG. 6 is a schematic diagram illustrating a structure of a data packet forwarding apparatus implemented by a SDN controller according to some examples of the present disclosure. The apparatus 600 includes an obtaining module 601, a receiving module 602, a processing module 603 and a transmitting module 604.

The obtaining module 601 is to obtain and store a NAT mapping relationship between a private network address and a public network of a host computer in each SDN.

The receiving module 602 is to receive a flow table request for a data packet from a VTEP device.

The processing module 603 is to search for a NAT mapping relationship corresponding to a target IP address of the data packet when the receiving module 602 receives the flow table request and it is determined that the data packet is forwarded across SDNs; generate a flow table used for forwarding the data packet according to the NAT mapping relationship corresponding to the target IP address searched out and network topology information, wherein the flow table comprises a NAT processing instruction for a source IP address and encapsulation information, and a target IP address in the encapsulation information is a public network address in the NAT mapping relationship searched out;

The transmitting module 604 is to transmit the flow table generated by the processing module 603 to the VTEP device.

Accordingly, after performing the NAT processing for the data packet, the VTEP device uses the encapsulation information in the flow table to perform VXLAN encapsulation for the data packet after performing the NAT processing, and transmits the data packet through the output port, wherein the target IP address in the encapsulation information is the public network address in the NAT mapping relationship.

In some examples, the processing module 603 is to search for the NAT mapping relationship corresponding to the source IP address according to the source IP address of the data packet; generate the flow table according to the NAT mapping relationship searched out corresponding to the source IP address, the NAT mapping relationship corresponding to the target IP address and the network topology information, wherein the flow table further comprises the NAT mapping relationship corresponding to the source IP address.

In particular, the processing module 603 is further to when the receiving module 602 receives the flow table request from the VTEP device, search for the NAT mapping relationship corresponding to the source IP address of the data packet, generate the flow table according to the NAT mapping relationship searched out and network topology information, wherein after receiving the data packet through the public network port and performing decapsulation for the data packet, the VTEP device transmits the flow table request.

The transmitting module 604 is to transmit the flow table generated by the processing module 603 to the VTEP device, so that the VTEP device uses the NAT mapping relationship corresponding to the source IP address in the flow table to perform the NAT processing for the source IP address of the data packet, and transmit the data packet through the output port.

In some examples, the obtaining module 601 is to receive and store a NAT mapping relationship reported by a VTEP device in a SDN managed by the SDN controller, synchronizing the received NAT mapping relationship to a SDN controller in another SDN, where the NAT mapping relationship reported by the VTEP device is the NAT mapping relationship between the private network address and the public network address of the host computer connecting with the VTEP device; receive and store a NAT mapping relationship synchronized from the SDN controller in the another SDN.

In some examples, the obtaining module 601 is to obtain the NAT mapping relationship through a BGP connection established with a SDN controller in another SDN.

Figure 8:
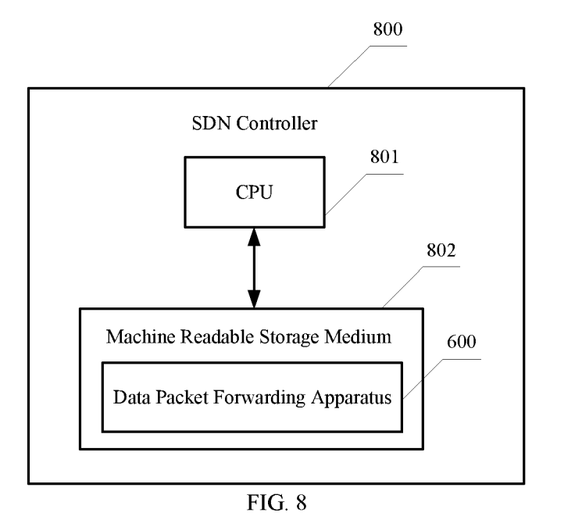
FIG. 8 is a schematic diagram illustrating a hardware structure of a SDN controller according to some examples of the present disclosure.

A SDN controller 800 provided by the present disclosure may be a programmable device including a combination of software and hardware. FIG. 8 is a schematic diagram illustrating a hardware structure of a SDN controller according to some examples of the present disclosure. As shown in FIG. 8, the SDN controller includes a machine readable storage medium 802 and CPU 801. In some examples, the Ethernet device 800 may further include other hardware.

The machine readable storage medium 802 is to store machine readable instructions that are executable by the CPU 801. The operations carried out by the machine readable instructions when executed by the CPU 801 include the functions carried out by the data packet forwarding apparatus 600.

The CPU 801 is to communicate with the machine readable storage medium 802, to read and execute the machine readable instructions stored in the machine readable storage medium 802 so as to implement the functions carried out by the data packet forwarding apparatus 600.

The data packet forwarding apparatus 600 is a logic apparatus, which may be implemented by the CPU 801 executing machine readable instructions in the machine readable storage medium 802. When the corresponding machine readable instructions are executed, the data packet forwarding apparatus 600 executes the corresponding operations according to the foregoing method.

Figure 7:
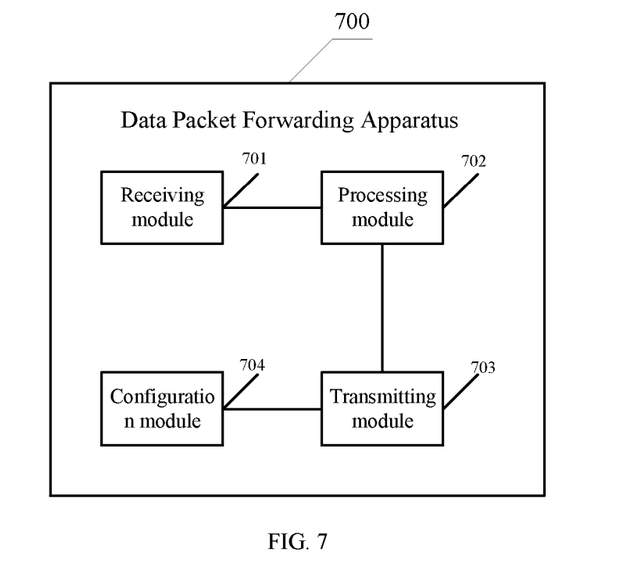
FIG. 7 is a schematic diagram illustrating a structure of a data packet forwarding apparatus implemented by a VTEP device according to some examples of the present disclosure.

Based on a same idea of the present disclosure, the present disclosure provides a data packet forwarding apparatus, to be implemented by a VTEP device. FIG. 7 is a schematic diagram illustrating a structure of a data packet forwarding apparatus implemented by a VTEP device according to some examples of the present disclosure. The apparatus 700 includes a receiving module 701, a processing module 702, and a transmitting module 703.

The receiving module 701 is to receive a data packet, and receive a flow table;

The processing module 702 is to when the receiving module 701 receives the data packet through a private network port, match the data packet to a flow table according to a first target IP address of the data packet; when the receiving module receives the flow table from the SDN controller, when the flow table comprises a NAT process instruction for the first source IP address, perform a NAT processing for the first source IP address of the data packet to obtain a public network address corresponding to the first source IP address, perform VXLAN encapsulation for the data packet according to the public network address corresponding to the first source IP address and encapsulation information in the flow table, wherein the a second source IP address of the encapsulated data packet is the public network address corresponding to the first source IP address, a second target IP address of the encapsulated data packet is the public network address corresponding to the first target IP address of the data packet in the flow table;

The transmitting module 703 is to transmit a flow table request to the SDN controller when the processing module 702 does not match the data packet with the flow table, forward the encapsulated data packet through an output port in the flow table.

Accordingly, the SDN controller issues the flow table according to network topology information and the NAT mapping relationship between the private network address and the public network address of a host computer in each SDN.

In some examples, the processing module 702 is to when the flow table further comprises a NAT mapping relationship corresponding to the first source IP address, perform the NAT processing for the first source IP address of the data packet according the NAT mapping relationship corresponding to the first source IP address to obtain the public network address corresponding to the first source IP address.

In particular, the processing module 702 is to when the receiving module 701 receives the VXLAN packet the first target IP address of which is the IP address of the VTEP device, obtain the data packet after performing the decapsulation; perform the flow table matching according to the first target IP address; when the receiving module 701 receives the flow table issued by the SDN controller, perform the NAT processing for the first source IP address of the data packet according to the NAT mapping relationship corresponding to the first source IP address.

The transmitting module 703 is to when the processing module 702 does not obtain the flow table matching with the data packet, transmit the flow table request to the SDN controller, so that the SDN controller issues the flow table according to the network topology and the stored NAT mapping relationship between the private network address and the public network address of the host computer in each SDN; forward the data packet after the processing module 702 performs the NAT processing through the output port in the flow table.

In some examples, the apparatus further includes a configuration module 704.

The configuration module 704 is to configure the NAT mapping relationship between a private network address and a public network address of a host computer connecting with the server.

The transmitting module 703 is further to report the NAT mapping relationship configured by the configuration module to the SDN controller.

Accordingly, the SDN controller stores and synchronizes the NAT mapping relationship to a SDN controller in another SDN.

Figure 9:
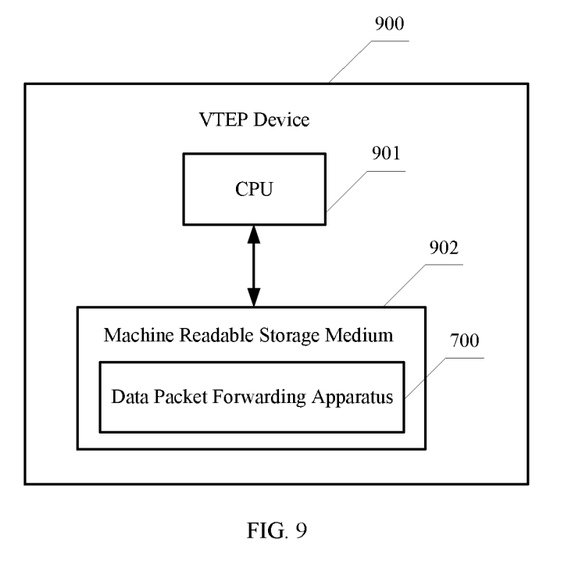
FIG. 9 is a schematic diagram illustrating a hardware structure of a SDN controller according to some examples of the present disclosure.

A VTEP device 900 provided by the present disclosure may be a programmable device including a combination of software and hardware. FIG. 9 is a schematic diagram illustrating a hardware structure of a SDN controller according to some examples of the present disclosure. As shown in FIG. 9, the VTEP device 900 includes a machine readable storage medium 902 and CPU 901. In some examples, the VTEP device 900 may further include other hardware.

The machine readable storage medium 902 is to store machine readable instructions that are executable by the CPU 901. The operations carried out by the machine readable instructions when executed by the CPU 901 include the functions carried out by the data packet forwarding apparatus 700.

The CPU 901 is to communicate with the machine readable storage medium 902, to read and execute the machine readable instructions stored in the machine readable storage medium 902 so as to implement the functions carried out by the data packet forwarding apparatus 700.

The data packet forwarding apparatus 700 is a logic apparatus, which may be implemented by the CPU 901 executing machine readable instructions in the machine readable storage medium 902. When the corresponding machine readable instructions are executed, the data packet forwarding apparatus 700 executes the corresponding operations according to the foregoing method.

In addition, according to some examples of the present disclosure, various function modules may be integrated into a processing entity, or may be separately deployed in physical; may be combined as a module, or may be separated to multiple sub-modules.

It can be seen from above that, the VTEP device has a layer 2 forwarding function, a layer 3 forwarding function and a NAT function. In particular, the BGP connection is established between SDN controllers in two SDNs, which is used to synchronize the NAT mapping relationship between the private network address and the public network address of the VM in another SDN controller, so that the flow table including the NAT processing and the VXLAN encapsulation information can be directly transmitted to the VTEP device, and the VTEP device performs the NAT operation for the data packet according to the flow table, performs the VXLAN encapsulation for the data packet, and transmits the data packet through the established VXLAN tunnel. According to technical solutions above, the VXLAN encapsulation and decapsulation is performed once in the process of forwarding the packet across SDNs, so as to simply the communication process across SDNs.

The foregoing is only preferred examples of the present invention and is not used to limit the protection scope of the present invention. Any modification, equivalent substitution and improvement without departing from the spirit and principle of the present invention are within the protection scope of the present invention.

What is claimed is:

1. A data packet forwarding method, to be implemented by a Software Defined Network (SDN) controller, comprising:
   obtaining and storing a Network Address Translation (NAT) mapping relationship between a private network address and a public network of a host computer in each SDN;
   receiving a flow table request for a data packet from a Virtual Extensible Local Area Network Tunnel End Point (VTEP) device, searching for a NAT mapping relationship corresponding to a target Internet Protocol (IP) address of the data packet when determining that the data packet is forwarded across SDNs;
   generating a flow table used for forwarding the data packet according to the NAT mapping relationship corresponding to the target IP address searched out and network topology information, and transmitting the flow table to the VTEP device, wherein the flow table comprises a NAT processing instruction for a source IP address and encapsulation information, and a target IP address in the encapsulation information is a public network address in the NAT mapping relationship searched out.

2. The method of claim 1, wherein generating the flow table used for forwarding the data packet comprises:
   searching for the NAT mapping relationship corresponding to the source IP address according to the source IP address of the data packet;
   generating the flow table according to the NAT mapping relationship searched out corresponding to the source IP address, the NAT mapping relationship corresponding to the target IP address and the network topology information, wherein the flow table further comprises the NAT mapping relationship corresponding to the source IP address.

3. The method of claim 1, wherein obtaining and storing the NAT mapping relationship between the private network address and the public network address of the host computer in each SDN comprises:
   receiving and storing a NAT mapping relationship reported by a VTEP device in a SDN managed by the SDN controller, synchronizing the received NAT mapping relationship to a SDN controller in another SDN, where the NAT mapping relationship reported by the VTEP device is the NAT mapping relationship between the private network address and the public network address of the host computer connecting with the VTEP device;
   receiving and storing a NAT mapping relationship synchronized from the SDN controller in the another SDN.

4. The method of claim 1, wherein obtaining the NAT mapping relationship between the private network address and the public network address in each SDN comprises:
   obtaining the NAT mapping relationship through a BGP connection established with a SDN controller in another SDN.

5. A data packet forwarding method, to be implemented by a Virtual Extensible Local Area Network Tunnel End Point (VTEP) device, comprising:
   when the data packet is received through a private network port, matching the data packet to a flow table according to a first target Internet Protocol (IP) address of the data packet;
   transmitting a flow table request to the Software Defined Network (SDN) controller when the data packet is not matched with the flow table;
   receiving the flow table from the SDN controller;
   when the flow table comprises a Network Address Translation (NAT) process instruction for the first source IP address, performing a NAT processing for the first source IP address of the data packet to obtain a public network address corresponding to the first source IP address, performing Virtual Extensible Local Area Network (VXLAN) encapsulation for the data packet according to the public network address corresponding to the first source IP address and encapsulation information in the flow table, wherein the a second source IP address of the encapsulated data packet is the public network address corresponding to the first source IP address, a second target IP address of the encapsulated data packet is the public network address corresponding to the first target IP address of the data packet in the flow table;
   forwarding the encapsulated data packet through an output port in the flow table.

6. The method of claim 5, wherein performing the NAT processing for the first source IP address of the data packet comprises:
   when the flow table further comprises a NAT mapping relationship corresponding to the first source IP address, performing the NAT processing for the first source IP address of the data packet according the NAT mapping relationship corresponding to the first source IP address to obtain the public network address corresponding to the first source IP address.

7. The method of claim 5, further comprising:
   configuring the NAT mapping relationship between a private network address and a public network address of a host computer connecting with the server, and reporting the NAT mapping relationship to the SDN controller.

8. A data packet forwarding apparatus, to be implemented by a Software Defined Network (SDN) controller, comprising:
- an obtaining module, to obtain and store a Network Address Translation (NAT) mapping relationship between a private network address and a public network of a host computer in each SDN;
- a receiving module, to receive a flow table request for a data packet from a Virtual Extensible Local Area Network Tunnel End Point (VTEP) device;
- a processing module, to search for a NAT mapping relationship corresponding to a target Internet Protocol (IP) address of the data packet when the receiving module receives the flow table and it is determined that the data packet is forwarded across SDNs; generate a flow table used for forwarding the data packet according to the NAT mapping relationship corresponding to the target IP address searched out and network topology information, wherein the flow table comprises a NAT processing instruction for a source IP address and encapsulation information, and a target IP address in the encapsulation information is a public network address in the NAT mapping relationship searched out;
- a transmitting module, to transmit the flow table generated by the processing module to the VTEP device.

9. The apparatus of claim 8, wherein the processing module is to search for the NAT mapping relationship corresponding to the source IP address according to the source IP address of the data packet; generate the flow table according to the NAT mapping relationship searched out corresponding to the source IP address, the NAT mapping relationship corresponding to the target IP address and the network topology information, wherein the flow table further comprises the NAT mapping relationship corresponding to the source IP address.

10. The apparatus of claim 8, wherein the obtaining module is to receive and store a NAT mapping relationship reported by a VTEP device in a SDN managed by the SDN controller, synchronizing the received NAT mapping relationship to a SDN controller in another SDN, where the NAT mapping relationship reported by the VTEP device is the NAT mapping relationship between the private network address and the public network address of the host computer connecting with the VTEP device; receive and store a NAT mapping relationship synchronized from the SDN controller in the another SDN.

11. The apparatus of claim 8, wherein the obtaining module is to obtain the NAT mapping relationship through a BGP connection established with a SDN controller in another SDN.

12. A data packet forwarding apparatus, to be implemented by a Virtual Extensible Local Area Network Tunnel End Point (VTEP) device, comprising:
- a receiving module, to receive a data packet, receive a flow table;
- a processing module, to when the receiving module receives the data packet through a private network port, match the data packet to a flow table according to a first target Internet Protocol (IP) address of the data packet; when the receiving module receives the flow table from the Software Defined Network (SDN) controller, when the flow table comprises a Network Address Translation (NAT) process instruction for the first source IP address, perform a NAT processing for the first source IP address of the data packet to obtain a public network address corresponding to the first source IP address, perform Virtual Extensible Local Area Network (VXLAN) encapsulation for the data packet according to the public network address corresponding to the first source IP address and encapsulation information in the flow table, wherein the a second source IP address of the encapsulated data packet is the public network address corresponding to the first source IP address, a second target IP address of the encapsulated data packet is the public network address corresponding to the first target IP address of the data packet in the flow table;
- a transmitting module, to transmit a flow table request to the SDN controller when the data packet is not matched with the flow table, forward the encapsulated data packet through an output port in the flow table.

13. The apparatus of claim 12, wherein the processing module is to when the flow table further comprises a NAT mapping relationship corresponding to the first source IP address, perform the NAT processing for the first source IP address of the data packet according the NAT mapping relationship corresponding to the first source IP address to obtain the public network address corresponding to the first source IP address.

14. The apparatus of claim 12, further comprising:
- a configuration module, to configure the NAT mapping relationship between a private network address and a public network address of a host computer connecting with the server;
- the transmitting module is further to report the NAT mapping relationship configured by the configuration module to the SDN controller.

* * * * *